United States Patent Office 3,642,667
Patented Feb. 15, 1972

3,642,667
POLYMERIZATION CATALYSTS
Kenneth E. Steller, Newark, Del., assignor to Hercules Incorporated, Wilmington, Del.
No Drawing. Filed Dec. 31, 1968, Ser. No. 789,016
Int. Cl. B01f 15/00
U.S. Cl. 260—2 A   15 Claims

ABSTRACT OF THE DISCLOSURE

Epoxides and oxetanes can be polymerized in the presence of trialkylaluminum compounds that have been complexed with tetrahydrofuran and then reacted with ether alcohol and diketone chelating agents and water. The thus complexed and chelated trialkylaluminum compounds are disclosed as new and useful.

---

This invention relates to an improved process of polymerizing epoxides and oxetanes and, more particularly, to an improved process of polymerizing epoxides and oxetanes with a trialkylaluminum compound.

It is known to use as catalysts for the polymerization of epoxides, trialkylaluminum compounds that have been complexed with tetrahydrofuran and then reacted with diketone chelating agents and water. Such catalysts give good yields at high rates of high molecular weight epoxide polymers.

It has now unexpectedly been found that catalytic activity and catalyst life can be markedly enhanced by the partial substitution of an ether alcohol for the diketone in the catalyst.

Any epoxide wherein the epoxy group is an oxirane or oxetane group may be homopolymerized or copolymerized with a second epoxide by the process of this invention to obtain improved results. Exemplary of the epoxides that can be homopolymerized or copolymerized are the alkylene oxides such as ethylene oxide, propylene oxide, butene oxides, isobutylene epoxide, substituted alkylene oxides such as epichlorohydrin, epibromohydrin, methallyl chloride epoxide, trifluoromethyl ethylene oxide, perfluoropropylene oxide, perfluoroethylene oxide, vinyl chloride epoxide, and dichloroisobutylene epoxide; cycloaliphatic oxides such as cyclohexene oxides, vinyl cyclohexene oxide, vinyl cyclohexene dioxide, alpha-pinene epoxide, and dipentene epoxide; epoxy ethers such as alkyl glycidyl ethers as, for example, methyl glycidyl ether, ethyl glycidyl ether, isopropyl glycidyl ether, isobutyl glycidyl ether, tertiary-butyl glycidyl ether, n-hexyl glycidyl ether, n-octyl glycidyl ether; phenyl glycidyl ether, chlorophenyl glycidyl ethers, nitrophenyl glycidyl ethers, alkyl phenyl glycidyl ethers, chloroalkyl glycidyl ethers, such as chloroethyl glycidyl ether, unsaturated glycidyl ethers such as vinyl glycidyl ether, and allyl glycidyl ether; glycidyl esters such as glycidyl acetate, glycidyl propionate, glycidyl pivalate, glycidyl methacrylate, and glycidyl acrylate; alkyl glycidates such as methyl glycidate, ethyl glycidate; trimethylene oxide (oxetane); alkyl substituted oxetanes, such as 2-ethyloxetane, 3-butyloxetane, and 3,3-dimethyloxetane; haloalkyl substituted oxetanes such as 2 - chloromethyloxetane and 3 - iodopropyloxetane; alkoxy substituted oxetanes such as 2 - ethoxyoxetane and 3 - propoxyoxetane; alkoxyalkyl substituted oxetanes such as 2 - butoxymethyloxetane and 3 - hexoxymethyloxetane; haloalkoxy substituted oxetanes such as 2 - bromobutoxyoxetane, 2 - chloroethoxyoxetane, and 3-fluoromethoxyoxetane; haloalkoxyalkyl substituted oxetanes such as 2-chloroethoxymethyloxetane and 3-fluoromethoxymethyloxetane; and other epoxides as for example, styrene oxide, alpha-methylstyrene oxide, butadiene monoxide, butadiene dioxide, epoxy stearates, 1-dimethylamino-2,3-epoxypropane, and trimethyl - 2,3-epoxypropyl ammonium chloride. As pointed out above, any of these epoxides can be homopolymerized or any mixture of two or more can be copolymerized.

Any trialkylaluminum compound can be reacted with tetrahydrofuran, water, a diketone, and an ether alcohol to produce the catalysts used in accordance with the invention. Exemplary alkylaluminum compounds are trimethylaluminum, triethylaluminum, tripropylaluminum, triisopropylaluminum, triisobutylaluminum, trihexylaluminum, and trioctylaluminum. Just why the thus treated trialkylaluminums are so effective in producing high molecular weight epoxide polymers in increased yields is not known. However, it has been found that this result is obtained when a trialkyl aluminum is reacted with from about 0.5 to about 10 mols of tetrahydrofuran per mol of aluminum, from about 0.5 to about 1.0 mol of water per mol of aluminum, from about 0.3 to about 1.0 mol of diketone per mol of aluminum and from about 0.05 to about 0.4 mol of ether alcohol per mol of aluminum. Typical of the diketones which can be reacted with a trialkylaluminum to produce the catalysts of this invention are acetyl acetone, trifluoroacetylacetone, acetonylacetone, benzoylacetone, furoylacetone, thenoyltrifluoroacetone, dibenzoyl methane, 3 - methyl - 2,4 - pentane-dione, and 3 - benzyl - 2,4 - pentane-dione. Typical of the ether alcohols which can be reacted with trialkylaluminums to produce the catalysts of this invention are 2-methoxy ethanol, 2-ethoxy ethanol, 2-(2-ethoxyethoxy)ethanol, tetrahydrofurfuryl alcohol, tetrahydropyran-2-methanol, and tetrahydrofuranpropanol.

Any desired procedure can be used for reacting the trialkylaluminum compound with the above-mentioned ingredients. It is readily done by adding the specified amounts of ingredient gradually to a solution of the trialkylaluminum compound in an inert diluent as for example a hydrocarbon diluent such as N-hexane, toluene, or an ether such as diethyl ether or a mixture of such diluents. It can also be done in the absence of a diluent. The trialkylaluminum should be complexed with the tetrahydrofuran first. The order in which the other ingredients are added is not critical. For example, the trialkylaluminum can first be complexed with the tetrahydrofuran and then reacted with water, the diketone and finally the ether alcohol. Best results are obtained if the formation of the catalyst is conducted at a low temperature of from about 0 to about 10° C. Most preferably the thus prepared catalyst will be aged for a substantial period of time as for example from about 2 days to about 30 days or heat aged for a period of from about 0.5 hour to about 15 hours at a temperature of from about 50° C. to 125° C. While aging is desired, excellent results can be obtained by using the catalyst immediately. Any amount of the trialkylaluminum catalyst can be used to catalyze the polymerization process in accordance with this invention, from a minor catalytic amount up to a large excess but in general will be within the range of from about 0.5 to about 5.0 mol percent based on the monomer being polymerized and preferably will be within the range from about 0.5 to about 2 mol percent based on the monomer being polymerized. The amount used depends in part on such factors as monomer purity and diluent purity, less pure epoxides and diluents requiring more catalyst to destroy reactive impurities. In order to decrease catalyst consumption it is generally preferred that impurities such as carbon dioxide, oxygen, aldehydes, alcohols, etc. be kept at as low a level as practical.

The polymerization reaction can be carried out by any desired means. Either as a batch or continuous process with the catalyst added all at one time or in increments during the polymerization or continuously throughout the polymerization. If desired the monomer can be added gradually to the polymerization system. It can be carried out as a bulk polymerization process, without a diluent, at the boiling point of the monomer (reduced to a convenient level by adjusting the pressure) so as to remove the heat of reaction. However, for ease of operation it is generally carried out in the presence of an inert diluent. Any diluent that is inert under the polymerization reaction conditions can be used as for example ethers such as the dialkyl, aryl, or cycloalkyl ethers as for example diethyl ether, dipropyl ether, diisopropyl ether, aromatic hydrocarbons such as benzene and toluene or saturated aliphatic hydrocarbons and cyclo aliphatic hydrocarbons such as n-heptane and cyclohexane. Also halogenated hydrocarbons as for example chlorobenzene or haloalkanes such as methyl chloride, methylene chloride, chloroform, carbontetrachloride and ethylene dichloride can be used. Obviously, any mixture of such diluents can be used and in many cases is preferable.

The polymerization process in accordance with this invention can be carried out over a wide range of temperature and pressure. Usually it will be carried out at a temperature of from about −80° C. to about 200° C. and more preferably within the range of from about −30° C. to about 150° C. Usually the polymerization process will be carried out at autogenous pressure but superatmospheric pressures up to several hundred pounds can be used if desired and in the same way subatmospheric pressures can also be used.

The following examples exemplify the improved results that can be obtained on polymerizing epoxides in accordance with this invention. All parts and percentages are by weight unless otherwise indicated.

All catalysts used in the examples are prepared as follows: The reaction vessel is flushed with anhydrous nitrogen and the entire reaction conducted under an atmosphere of nitrogen. An aliquot of 25% of the desired trialkylaluminum in toluene is placed in the vessel by syringe and cooled to near 0° C. The required amount of tetrahydrofuran is then added with agitation. After cooling for 10 minutes, nitrogen-purged distilled water in the required amount is added dropwise with agitation. After further cooling the diketone and ether alcohol are also added dropwise with agitation. The agitation is contained for approximately 10 minutes and then the solution is allowed to come to room temperature. If the catalyst is to be heat-aged, it may be done at this time. In each case the catalyst is maintained in a sealed container under an atmosphere of nitrogen until it is used.

The trialkylaluminum used in Examples 1–23 is triethylaluminum. In Example 24 triisobutylaluminum is used.

EXAMPLE 1

This example illustrates the polymerization of ethylene oxide.

The catalyst is prepared as described above and contains 6 mols of tetrahydrofuran, 0.8 mol of water, 0.4 mol of acetylacetone, and 0.1 mol of tetrahydrofurfuryl alcohol per mol of aluminum. After its preparation the catalyst is aged for 1 hour at a temperature of 95° C.

A polymerization vessel is flushed with nitrogen and is charged with 5 parts of ethylene oxide in 70 parts of toluene. After equilibrating at 50° C., a solution of the catalyst equivalent to 17.5 millimols per mol of monomer is added with agitation. After 5 minutes the reaction is short stopped by adding a 10% solution of ethyl alcohol in toluene. The polymer is recovered by precipitation with heptane, dried and weighed. The conversion amounts to 94.1% of a solid polymer having a molecular weight of approximately 1,000,000.

EXAMPLE 2

This example illustrates the copolymerization of ethylene oxide and epichlorohydrin.

The catalyst is prepared as described above and contains 6 mols of tetrahydrofuran, 0.5 mol of water, 0.4 mol of acetylacetone, and 0.1 mol of tetrahydrofurfuryl alcohol per mol of aluminum.

A polymerization vessel is flushed with nitrogen and charged with 10 parts of a mixture of ethylene oxide and epichlorohydrin in 90 parts of toluene. The monomers are present in the solution in a 50:50 mol ratio. After equilibrating at 95° C. a solution of the catalyst equivalent to 13.6 millimols per mol of monomers is added with agitation. The copolymerization is allowed to run for 60 minutes and then shortstopped by adding a 10% solution of ethylalcohol in toluene. The copolymer is recovered by steam coagulation, dried and weighed. A control run was made using a prior art catalyst. The catalyst is identical to the instant catalyst except it contains 6 mols of diethyl ether in place of the tetrahydrofuran and contains no tetrahydrofurfuryl alcohol. The percentage conversion using the catalysts of this invention is approximately 56%. The percentage conversion using the prior art catalysts is approximately 20%.

EXAMPLES 3–8

These examples illustrate the effect of varying the amount of ether alcohol in the catalyst.

In each case the catalyst is prepared as described above and contains 6 mols of tetrahydrofuran and 0.5 mol of water per mol of aluminum, but the amounts of acetylacetone and tetrahydrofurfuryl alcohol are varied. Each catalyst is aged 2 weeks at room temperature and then heat aged 45 minutes at 95° C.

In each example a polymerization vessel is flushed with nitrogen and charged with 10 parts of a mixture or ethylene oxide and epichlorohydrin in 90 parts of toluene. The mol ratio of monomers is 12.75 ethylene oxide to 87.25 epichlorohydrin. The polymerizations are conducted as described in Example 2 using 17.3 millimols of catalyst/mol of monomers. The reactions are shortstopped after 30 minutes also as described in Example 2, the copolymer recovered by steam coagulation, dried and weighed. The percent conversion and the mols of acetylacetone and tetrahydrofurfuryl alcohol per mol of aluminum are tabulated in Table I.

TABLE I

| Example | Mols acetylacetone/mol of aluminum | Mols tetrahydrofurfuryl alcohol/mol of aluminum | Percent conversion |
|---|---|---|---|
| 3 | 0.50 | 0 | 36 |
| 4 | 0.45 | 0.05 | 69 |
| 5 | 0.40 | 0.10 | 61 |
| 6 | 0.35 | 0.15 | 62 |
| 7 | 0.30 | 0.20 | 69 |
| 8 | 0.25 | 0.25 | 50 |

EXAMPLES 9–15

These examples illustrate the effect of varying the amount of water in the catalyst.

In each case the catalyst is prepared as described above and contains 6 mols of tetrahydrofuran, 0.4 mol of acetylacetone, 0.1 mol of tetrahydrofurfuryl alcohol per mol of aluminum, but the amount of water is varied. After its preparation the catalyst is aged 1 hour at a temperature of 95° C.

In each example a polymerization vessel is flushed with nitrogen and charged with 10 parts of a mixture of ethylene oxide and epichlorohydrin in 90 parts of toluene. The mol ratio of monomers is 50:50. The copolymerization is conducted as described in Example 2. The reactions are shortstopped after 30 minutes also as described in Example 2, the copolymer recovered by steam coagulation, dried and weighed. The percent conversion and the mols of water per mol of aluminum are tabulated in Table II.

TABLE II

| Example: | Mol water/mol of aluminum | Percent conversion |
|---|---|---|
| 9 | 0.50 | 40 |
| 10 | 0.70 | 53 |
| 11 | 0.75 | 57 |
| 12 | 0.80 | 59 |
| 13 | 0.85 | 61 |
| 14 | 0.90 | 57 |
| 15 | 0.95 | 50 |

EXAMPLE 16

This example illustrates the homopolymerization of epichlorohydrin.

The catalyst is prepared as described above and contains 6 mols of tetrahydrofuran, 0.5 mol of water, 0.4 mol of acetylacetone, and 0.1 mol of tetrahydrofurfuryl alcohol per mol of aluminum. The resulting catalyst is heat-aged by placing it in an oven, slowly raising the temperature to 95° C. and then allowing it to cool slowly to room temperature.

A polymerization vessel is flushed with nitrogen and charged with 10 parts of epichlorohydrin and 90 parts of toluene. After equilibrating at 95° C. a solution of the catalyst equivalent to 18.5 millimols per mol of monomer is added with agitation. After 30 minutes the reaction is shortstopped by adding a 10% solution of ethyl alcohol in toluene. The polymer is isolated by steam coagulation, dried, and weighed. The conversion amounts to 77% of a solid polymer having a molecular weight of approximately 2,900,000.

EXAMPLES 17–19

These examples illustrate the use of various ether alcohols in the catalyst.

In each case the catalyst is prepared as described above and contains 6 mols of tetrahydrofuran, 0.5 mol of water, 0.4 mol of acetylacetone, and 0.1 mol of ether alcohol per mol of aluminum. Each catalyst is heat-aged for one hour at 95° C.

In each example a polymerization vessel is flushed with nitrogen and charged with 10 parts of a mixture of ethylene oxide and epichlorohydrin in 90 parts of toluene. The monomers are present in the solution in a 50:50 mol ratio. The polymerizations are conducted as described in Example 2 using 13.6 millimols of catalyst per mol of monomers. The reactions are shortstopped after 30 minutes also as described in Example 2. The copolymer is isolated in each example by evaporation of the solvent, dried, and weighed. The percent conversions and the specific ether alcohols used are tabulated below.

| Examples: | Ether alcohol used | Percent conversion |
|---|---|---|
| 17 | Tetrahydropyran-2-methanol | 37.9 |
| 18 | 2-methoxyethanol | 37.0 |
| 19 | Tetrahydrofurfuryl alcohol | 43.1 |

EXAMPLE 20

This example illustrates the polymerization of phenyl glycidyl ether.

The catalyst is prepared as described above and contains 6 mols of tetrahydrofuran, 0.5 mol of water, 0.4 mol of acetylacetone, and 0.1 mol of tetrahydrofurfuryl alcohol per mol of aluminum.

A polymerization vessel is flushed with nitrogen and charged with 20 parts of phenyl glycilyl ether in 70 parts of heptane. After equilibrating at 95° C., a solution of the catalyst equivalent to 30.8 millimols of catalyst per mol of monomer is added with agitation. After approximately 4½ hours the reaction is shortstopped by adding a 10% solution of ethyl alcohol in heptane. The polymer is isolated, dried and weighed. The conversion amounts to essentially 100% of solid high molecular weight polymer.

EXAMPLE 21

This example illustrates the polymerization of 3,3-bis-(chloromethyl)oxetane.

The catalyst is prepared as described above and contains 6 mols of tetrahydrofuran, 0.5 mol of water, 0.4 mol of acetylacetone, and 0.1 mol of tetrahydrofurfuryl alcohol per mol of aluminum.

A polymerization vessel is flushed with nitrogen and charged with 10 parts of 3,3-bis(chloromethyl)oxetane. After equilibrating at 180° C. a solution of the catalyst equivalent to 15.5 millimols of catalyst per mol of monomer is added with agitation. After 46 hours the polymerization is shortstopped by adding a 10% solution of ethyl alcohol and toluene. The conversion to high molecular weight polymer is substantially 100% as determined by total solids.

EXAMPLE 22

This example illustrates the polymerization of trimethylene oxide.

The catalyst is prepared as described above and contains 6 mols of tetrahydrofuran, 0.5 mol of water, 0.4 mol of acetylacetone, and 0.1 mol of tetrahydrofurfuryl alcohol per mol of aluminum. The catalyst is heat-aged by placing in an oven, slowly raising the temperature to 95° C. and then slowly cooling it to room temperature.

A polymerization vessel is flushed with nitrogen and charged with 10 parts of trimethylene oxide and 70 parts of toluene. After equilibrating at 95° C. a solution of the catalyst equivalent to 35 millimols catalyst per mol of monomer is added with agitation. After 15 hours the reaction is shortstopped with a 10% solution of ethyl alcohol in toluene. The polymer is isolated by precipitation with heptane, dried, and weighed. The conversion is substantially 100% to a high molecular weight polymer.

EXAMPLE 23

This example illustrates the copolymerization of ethylene oxide and epichlorohydrin.

The catalyst is prepared as described above and contains 6 mols of tetrahydrofuran, 0.5 mol of water, 0.4 mol of 1-phenyl-1,3-butanedione, and 0.1 mol of tetrahydrofurfuryl alcohol per mol of aluminum. The catalyst is aged for one hour at a temperature of 95° C.

A polymerization vessel is flushed with nitrogen and charged with 10 parts of a mixture of ethylene oxide and epichlorohydrin in 90 parts of toluene. The monomers are present in the solution in a 50:50 mol ratio. After equilibrating at 95° C. a solution of the catalyst equivalent to 13.6 millimols catalyst per mol of monomers is added with agitation. The copolymerization is allowed to run for 30 minutes and then shortstopped by adding a 10% solution of ethyl alcohol and toluene. The copolymer is recovered by steam coagulation, dried, and weighed. A control run is made using the above-described catalyst except the tetrahydrofurfuryl alcohol is omitted. The percentage conversion using the catalyst with the ether alcohol is 40.1%. The percentage conversion using the catalyst without the ether alcohol is 22.6%.

EXAMPLE 24

This example illustrates the copolymerization of ethylene oxide and epichlorohydrin.

The catalyst is prepared as described above using triisobutylaluminum and contains 6 mols of tetrahydrofuran, 0.5 mol of water, 0.4 mol of acetylacetone, and 0.1 mol of tetrahydrofurfuryl alcohol per mol of aluminum. The catalyst is heat-aged for one hour at a temperature of 95° C.

A polymerization vessel is flushed with nitrogen and charged with 10 parts of a mixture of ethylene oxide and epichlorohydrin in 90 parts of toluene. The monomers are present in the solution in a 50:50 mol ratio. After equilibrating at 95° C. a solution of the catalyst equivalent to 13.6 millimols catalyst per mol of monomers is added with agitation. The copolymerization is allowed to run for 2 hours and then shortstopped by adding a 10% solution of ethyl alcohol in toluene. The copolymer is recovered by steam coagulation, dried and weighed. A control run is made using the above-described catalyst except for the omission of the tetrahydrofurfuryl alcohol. The percentage conversion using the catalyst containing the tetrahydrofurfuryl alcohol is 32.2%. The percentage conversion using the catalyst without the tetrahydrofurfuryl alcohol is substantially less.

What I claim and desire to protect by Letters Patent is:

1. The process of polymerizing epoxides which comprises contacting at least one of said epoxides with a catalyst formed by reacting a trialkylaluminum compound first with from about 0.5 to about 10 mols of tetrahydrofuran per mol of aluminum, then with from about 0.5 to about 1.0 mol of water per mol of aluminum, from about 0.3 to about 1.0 mol of diketone per mol of aluminum, and with from about 0.05 to about 0.4 mol of ether alcohol per mol of aluminum, said epoxides being selected from the group consisting of oxiranes and oxetanes and said ether alcohol being selected from 2-methoxyethanol, 2-ethoxyethanol, 2-(2-ethoxyethoxy)ethanol, tetrahydrofurfuryl alcohol, tetrahydropyran-2-methanol, and tetrahydrofuranpropanol.

2. The process of claim 1 wherein the epoxide is trimethylene oxide.

3. The process of claim 1 wherein the epoxide is ethylene oxide.

4. The process of claim 1 wherein the epoxide is phenyl glycidyl ether.

5. The process of claim 1 wherein the epoxide is epichlorohydrin.

6. The process of claim 1 wherein the epoxide is a mixture of ethylene oxide and epichlorohydrin.

7. The process of claim 1 wherein the diketone is acetylacetone.

8. The process of claim 1 wherein the diketone is 1-phenyl-1,3-butanedione.

9. The process of claim 1 wherein the ether alcohol is tetrahydrofurfuryl alcohol.

10. The process of claim 1 wherein the trialkylaluminum compound is triethylaluminum.

11. In the process of polymerizing epoxides selected from the group consisting of oxiranes and oxetanes which comprises contacting at least one of said epoxides with a catalyst formed by reacting a trialkylaluminum compound first with from about 0.5 to about 10 mols of tetrahydrofuran per mol of aluminum, then with from about 0.5 to about 1.0 mol of water per mol of aluminum, and from about 0.3 to about 1.0 mol of diketone per mol of aluminum, the improvement of adding from about 0.55 to about 0.4 mol of an ether alcohol per mol of aluminum, said ether alcohol being selected from 2-methoxyethanol, 2-ethoxyethanol, 2-(2-ethoxyethoxy)ethanol, tetrahydrofurfuryl alcohol, tetrahydropyran-2-methanol, and tetrahydrofuranpropanol.

12. The process of claim 11 wherein the ether alcohol is tetrahydrofurfuryl alcohol.

13. A polymerization catalyst formed by reacting a trialkylaluminum compound first with from about 0.5 to about 10 mols of tetrahydrofuran per mol of aluminum, then with from about 0.5 to about 1.0 mol of water per mol of aluminum, from about 0.3 to about 1.0 mol of diketone per mol of aluminum, and from about 0.05 to about 0.4 mol of ether alcohol per mol of aluminum, said eher alcohol being selected from 2-methoxyethanol, 2-ethoxyethanol, 2-(2-ethoxyethoxy)ethanol, tetrahydrofurfuryl alcohol, tetrahydropyran-2-methanol, and tetrahydrofuranpropanol.

14. The catalyst of claim 13 wherein the trialkylaluminum compound is triethylaluminum.

15. The catalyst of claim 13 wherein the trialkylaluminum compound is triisobutylaluminum.

References Cited

UNITED STATES PATENTS 3,135,705 6/1964 Van den Berg _____ 252—431
3,158,581 11/1964 Van den Berg _____ 252—431

DANIEL E. WYMAN, Primary Examiner

P. M. FRENCH, Assistant Examiner

U.S. Cl. X.R.

252—431; 260—2 XA

PO-1050
(5/69)

UNITED STATES PATENT OFFICE
CERTIFICATE OF CORRECTION

Patent No. U.S.P. 3,642,667     Dated February 15, 1972

Inventor(s) Kenneth E. Steller (Case 1)

It is certified that error appears in the above-identified patent and that said Letters Patent are hereby corrected as shown below:

Col. 4, Line 33 of p.p.;
"or" -- should be -- "of"

Col. 4, TABLE I, under percent conversion

| "36 | -- should be -- | "31 |
|---|---|---|
| 69 | | 66 |
| 61 | | 69 |
| 62 | | 66 |
| 69 | | 60 |
| 50" | | 52" |

Col. 5, Line 68 of p.p.;
"glycilyl" -- should be -- "glycidyl"

Col. 8, Line 9 of p.p.;
"0.55" -- should be -- "0.05"

Signed and sealed this 20th day of June 1972.

(SEAL)
Attest:

EDWARD M. FLETCHER, JR.
Attesting Officer

ROBERT GOTTSCHALK
Commissioner of Patents